US009656503B2

(12) United States Patent
O'Keefe et al.

(10) Patent No.: US 9,656,503 B2
(45) Date of Patent: May 23, 2017

(54) PRINTABLE STICKER FORM WITH A MANUAL ADHESIVE TRANSFER/PLACEMENT SYSTEM

(75) Inventors: Robert V. O'Keefe, Stillwater, MN (US); Andrew J. Stoick, Minneapolis, MN (US)

(73) Assignee: PROCESS LABEL SYSTEMS, Minneapolis, MN (US)

( * ) Notice: Subject to any disclaimer, the term of this patent is extended or adjusted under 35 U.S.C. 154(b) by 1247 days.

(21) Appl. No.: 13/054,508

(22) PCT Filed: Jul. 16, 2009

(86) PCT No.: PCT/US2009/004128
§ 371 (c)(1),
(2), (4) Date: Jul. 1, 2011

(87) PCT Pub. No.: WO2010/008572
PCT Pub. Date: Jan. 21, 2010

(65) Prior Publication Data

US 2011/0253297 A1 Oct. 20, 2011

Related U.S. Application Data

(60) Provisional application No. 61/135,251, filed on Jul. 18, 2008.

(51) Int. Cl.
*B44C 1/165* (2006.01)
*B29C 65/48* (2006.01)
(Continued)

(52) U.S. Cl.
CPC ............ *B42D 5/027* (2013.01); *B42D 25/00* (2014.10); *B42D 25/47* (2014.10)

(58) Field of Classification Search
CPC .... B31B 1/14; B31B 1/26; B31B 1/62; B31B 19/62; B31B 1/88; B31B 49/04;
(Continued)

(56) References Cited

U.S. PATENT DOCUMENTS 4,159,586 A * 7/1979 Blum .............................. 40/638
4,568,403 A 2/1986 Egan
(Continued)

FOREIGN PATENT DOCUMENTS

EP 0 552 956 7/1993
WO WO 01/02191 1/2001

*Primary Examiner* — Sing P Chan
(74) *Attorney, Agent, or Firm* — Kagan Binder, PLLC

(57) ABSTRACT

Forms that can be used to make stickers easily on demand, wherein the stickers are of the type in which a face of the sticker that bears printed information (graphic, textual, bar code, security, and/or other) also bears an adhesive that is used to affix the sticker to a desired substrate. A carrier sheet supports a sticker body and an adhesive source. The sticker body and the adhesive are initially separated on the form. The sticker face and the adhesive are registrably positioned with respect to a fold line. This allows the adhesive to be transferred to the sticker face on demand by an easy, desirably manual process that involves folding the form along the fold line. When the form is unfolded, the sticker can be removed and applied to the desired substrate.

21 Claims, 6 Drawing Sheets

Window Label/Form Instructions for use

(51) Int. Cl.

| | |
|---|---|
| ***B32B 37/12*** | (2006.01) |
| ***B32B 37/26*** | (2006.01) |
| ***B32B 38/10*** | (2006.01) |
| ***B32B 38/14*** | (2006.01) |
| ***B42D 5/02*** | (2006.01) |
| ***B42D 25/00*** | (2014.01) |
| ***B42D 25/47*** | (2014.01) |

(58) Field of Classification Search

CPC .. B65H 45/30; B65H 3/20; B65H 2404/5391; B65B 7/20; B42D 25/00; B42D 25/47; B42D 5/027

USPC .......................... 156/227, 230, 247, 249, 277

See application file for complete search history.

(56) References Cited

U.S. PATENT DOCUMENTS

| | | | | |
|---|---|---|---|---|
| 4,951,970 | A | 8/1990 | Burt | |
| 5,230,938 | A * | 7/1993 | Hess et al. | 428/42.3 |
| 5,267,899 | A | 12/1993 | Longtin | |
| 5,397,117 | A | 3/1995 | Mertens | |
| 5,466,013 | A | 11/1995 | Garrison | |
| 5,507,464 | A | 4/1996 | Hamerski et al. | |
| 5,518,787 | A | 5/1996 | Konkol | |
| 5,543,201 | A * | 8/1996 | Drower | 428/142 |
| 5,589,025 | A | 12/1996 | Garrison | |
| 5,595,403 | A | 1/1997 | Garrison | |
| 5,695,589 | A | 12/1997 | German et al. | |
| 5,770,283 | A | 6/1998 | Gosselin et al. | |
| 5,890,743 | A | 4/1999 | Garrison et al. | |
| 5,915,733 | A | 6/1999 | Schnitzer et al. | |
| 5,916,665 | A * | 6/1999 | Fischer et al. | 428/195.1 |
| 5,933,993 | A | 8/1999 | Riley | |
| 6,001,471 | A | 12/1999 | Bries et al. | |
| 6,092,843 | A | 7/2000 | Peterson et al. | |
| 6,305,717 | B1 | 10/2001 | Chess | |
| 6,318,757 | B1 | 11/2001 | Ritchie et al. | |
| 6,667,739 | B2 | 12/2003 | Atwood et al. | |
| 7,914,869 | B2 * | 3/2011 | Hodsdon et al. | 428/40.1 |
| 8,246,081 | B2 * | 8/2012 | Souparis | 283/106 |
| 2003/0168550 | A1 * | 9/2003 | Formon et al. | 242/564.1 |
| 2005/0001422 | A1 * | 1/2005 | O'Keefe et al. | 283/98 |
| 2005/0147781 | A1 * | 7/2005 | Dronzek et al. | 428/40.1 |

* cited by examiner

Window Label/Form
Instructions for use

Step 1: Fold once and tear to remove bottom portion of form.

Step 2: Remove protective liner from right side.

Step 3: Fold at perforation

Step 4: Press firmly over entire area.

Step 5: Peel back and remove label from die cut area.

PRINTABLE STICKER FORM WITH A MANUAL ADHESIVE TRANSFER/PLACEMENT SYSTEM

PRIORITY

This application claims the benefit of U.S. Provisional Application Ser. No. 61/135,251, filed Jul. 18, 2008, entitled "Printable Sticker Form With A Manual Adhesive Transfer/Placement System" which application is incorporated herein by reference in its entirety.

FIELD OF THE INVENTION

The present invention relates to a printable intermediate construction, methods of making the intermediate, methods of printing onto the intermediate, and methods of forming the intermediate into a sticker, such as a window sticker or the like, using a manual adhesive transfer/placement system in which a folding action transfers adhesive from a source onto a face of the sticker body.

BACKGROUND OF THE INVENTION

Indicia-bearing, laminated forms are widely used by a variety of businesses and governmental entities to provide their customers or citizens with many forms of identification or other documentation. These are used as membership and identification cards, drivers licenses, parking decals, vehicle registration documentation, license tabs, and the like. Such forms typically comprise many layers of differing materials in which printed information is printed onto one or more layers. The information typically can be human or machine readable. The information can be printed on the surface or can be "buried" on one or more inner card layers. Buried information may be preferred in some instances for security purposes and/or inasmuch as overlying layer(s) protect the buried information from wear and tampering.

Business forms for making laminated identification cards on demand have been developed. Typically, these contain card portions supported on a carrier. In use, desired printing is applied to the form on demand after which the form is folded to laminate the portions together. The resultant laminated construction can then be removed. See, e.g., U.S. Pat. Nos. 6,305,717; 5,915,733; 5,543,201; and 5,518,787; and PCT publication WO 01/02191.

Window stickers are another example of widely used business forms. In the case of motor vehicles, these may be used to document vehicle registration, vehicle authorization to access certain areas, and the like. Window stickers are also provided on the windows of residential and business buildings to convey desired information such as address information, business name information, hours of operation, notice of security protection, and the like. Window stickers can be placed on the inside or outside of windows. Interior placement is often desired to protect the sticker against degradation from the environment, from tampering, etc. Interior stickers often include adhesive on the same face that bears printed information. This face is then affixed to the inside of a window, allowing the sticker face to be viewed from the exterior.

One challenge that has limited the use of such window stickers concerns the logistics for placing not only fixed and variable information on the sticker face, but also the adhesive. Generally, it would be desirable to apply the printed information onto the face before the adhesive is applied. However, the variable information to be applied onto a sticker generally may not be known until the time of purchase, registration, or the like. One could delay placing adhesive onto a sticker face until after the variable information is applied, but conventional techniques involve spraying, brushing, masked adhesive transfer, or the like. Such techniques can involve costly hardware or user protection equipment (particularly in the case of adhesive spraying). In practice, these logistic challenges have posed serious burdens that have limited the widespread use of stickers for applications such as vehicle registration that necessitate applying variable information unique to a user or subset of users at a time of purchase, registration, leasing, or other point of transaction.

It would thus be desirable to provide an intermediate construction that may be easily formed into a window sticker without requiring the use of expensive equipment. Desirably, the sticker so formed could be formed precisely. It would further be desirable to provide such an intermediate construction that further may have provided thereon any desired indicia, fixed or variable, of any number and complexity, while yet still allowing sticker production therefrom on-demand and at a low cost. Finally, such an intermediate construction would desirably be capable of being used to produce a sticker that is substantially tamper resistant, so that the indicia printed thereupon has sufficient integrity for its intended purpose.

SUMMARY OF THE INVENTION

The present invention provides forms that can be used to make stickers easily on demand, wherein the stickers are of the type in which a face of the sticker that bears printed information (graphic, textual, bar code, security, and/or other) also bears an adhesive that is used to affix the sticker to a desired substrate. Often in use, the substrate is a transparent or translucent substrate such as a window of a motor vehicle or building. The sticker face is affixed to one side of the substrate, allowing the information on the sticker face to be viewed from the other side of the substrate. An exemplary use occurs when such a sticker is applied onto the inside of a windshield of a motor vehicle, allowing the sticker face to be viewed from the exterior of the vehicle. Such stickers may be used for vehicle registration, vehicle access to parking lots or other restricted facilities, and the like.

One innovative feature of the present invention is that the sticker body and the adhesive to be provided onto the sticker body face are initially separated on the form. The sticker face and the adhesive are registrably positioned with respect to a fold line that allows the adhesive to be transferred to the sticker face on demand by an easy, desirably manual process that involves folding the form along the fold line. The adhesive also is initially protected, such as being covered by a removable liner. This allows the form to be printed with fixed and/or variable information before the adhesive is transferred to the face of the sticker body. Optionally, the form can be pre-printed with certain kinds of fixed information common to a plurality of forms. At the point of use, the form can be printed with variable information that is unique to one or a greater number of the forms. After the desired printing is complete, the protective cover over the adhesive is removed. The form is folded in a manner to transfer the adhesive from its source on one side of the fold line to the sticker body on the other. This transfer can be done by hand without having to use automated equipment. When the form is unfolded, the sticker can be removed and applied to the desired substrate. If the sticker will not be used immediately, a protective cover with a suitable release coating can be applied over the sticker face now bearing the adhesive. For example, in a preferred embodiment described further below, a part of the system used to make a sticker can function as a protective cover until the sticker is ready for use.

The adhesive transferred to the sticker body can be permanent or releasable. For some applications such as vehicle registration, or where sticker authenticity or security are an issue, the sticker adhesive can be relatively more permanent so that the sticker would be damaged or otherwise modified if an attempt to remove the sticker were to be made. In other applications where it might be desirable to re-position the sticker one or more times, the adhesive can be of the re-positionable type allowing the sticker to be relocated one or more times without undue damage.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein.

DETAILED DESCRIPTION OF PRESENTLY PREFERRED EMBODIMENTS

Figure 1:
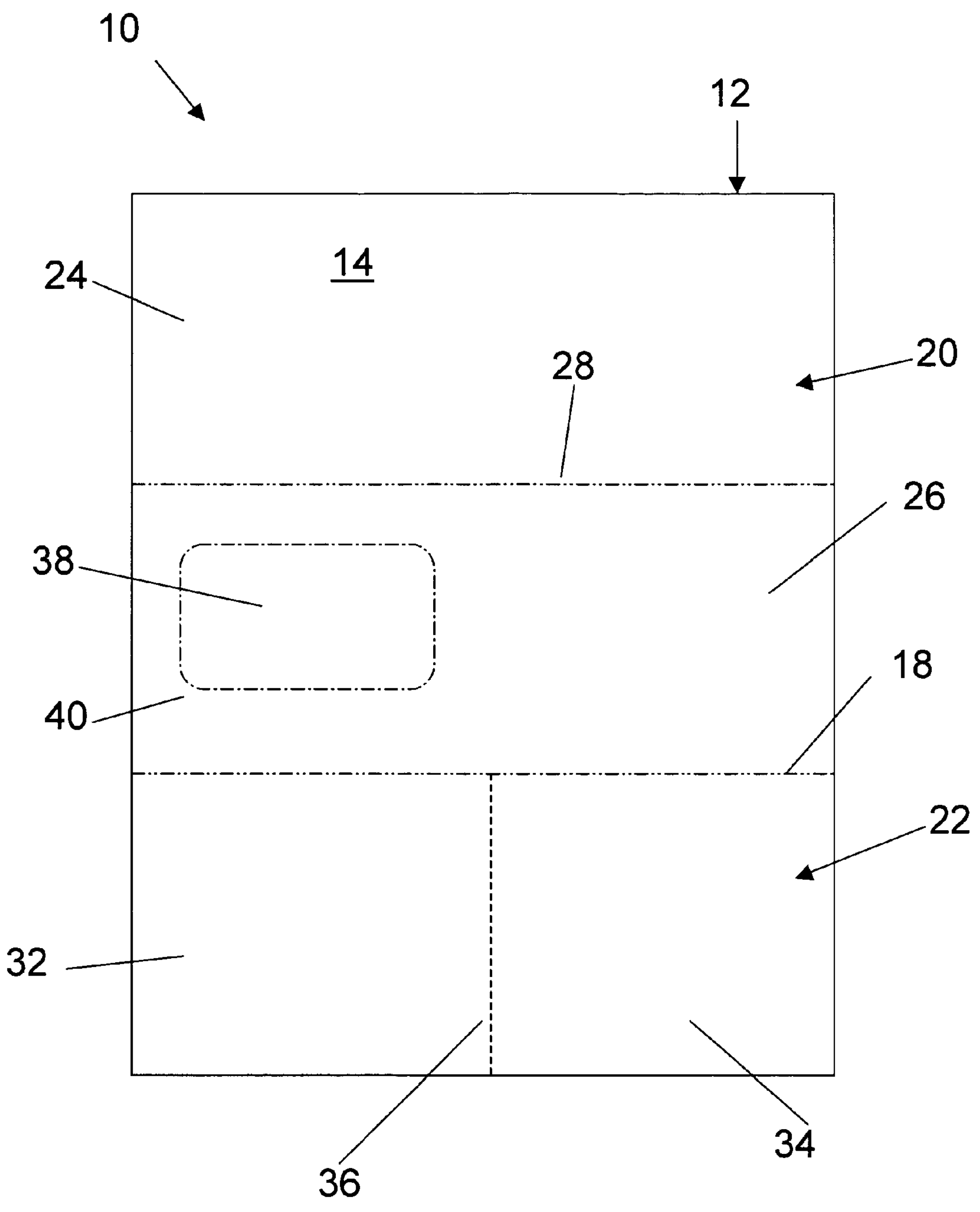
FIG. 1 is a top view of a carrier sheet bearing perforations and fold lines useful in a representative sticker assembly system of the present invention.
Figure 2:
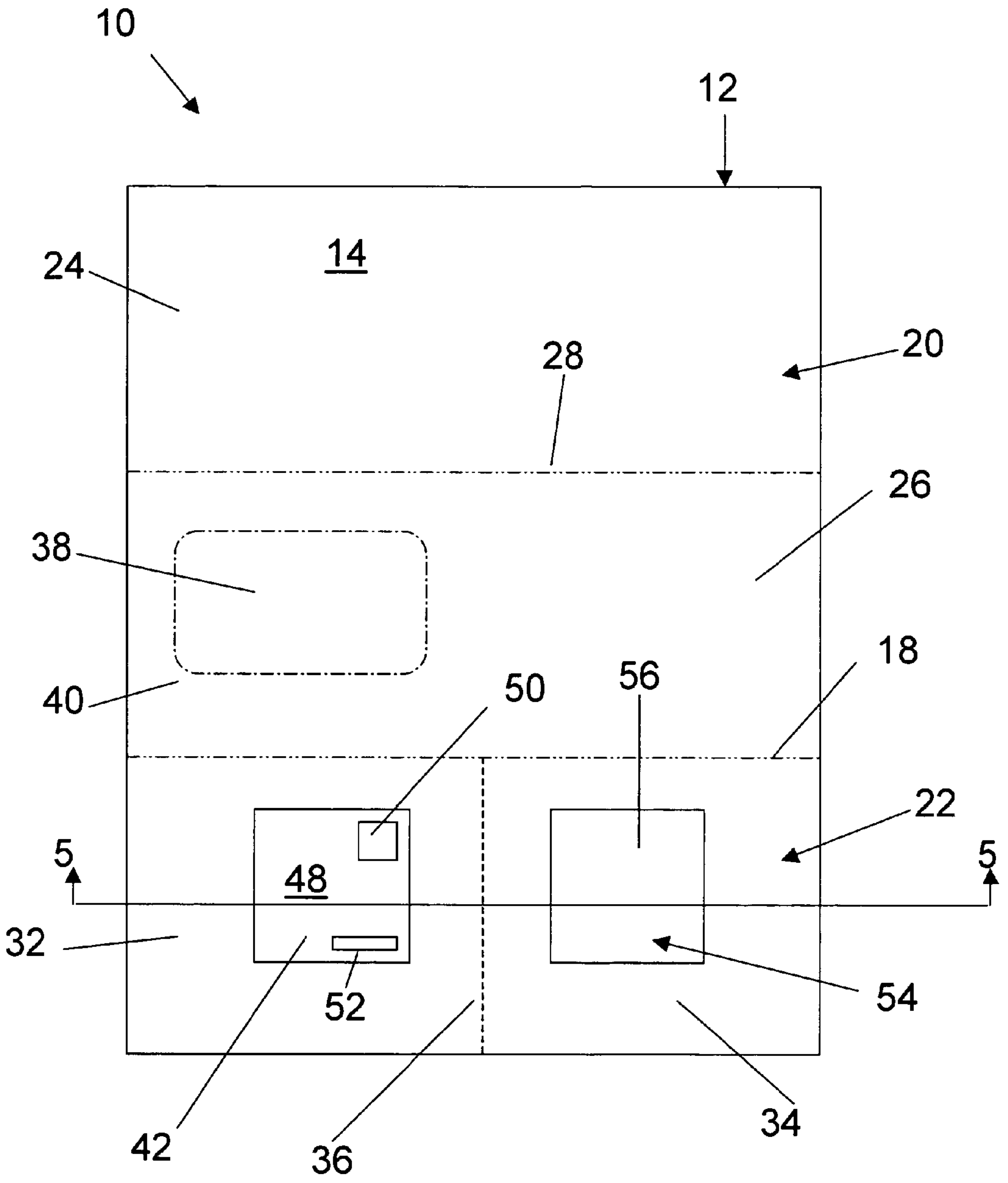
FIG. 2 is a top view of the carrier sheet of FIG. 1 further comprising a sticker body on a first panel and a protected adhesive source on a second panel.
Figure 3:
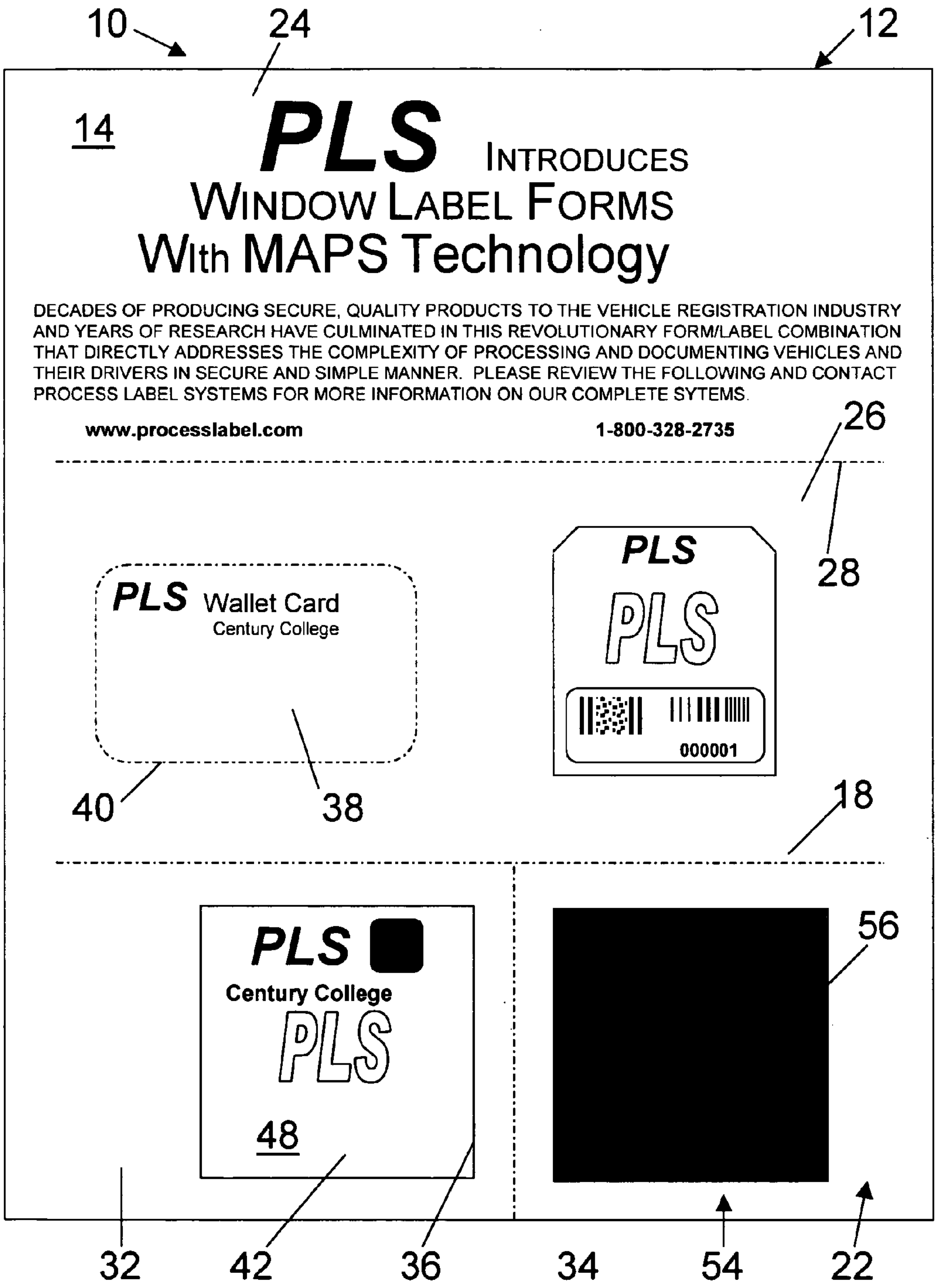
FIG. 3 is a top view of the carrier sheet, sticker body, and adhesive source shown in FIG. 2, further comprising representative kinds of fixed information that can be printed onto the system.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention. While the present invention will be described in the specific context of improvements to making window stickers for substrates such as motor vehicles, it will be understood that the present invention can be used in other contexts, including auto assembly data, VIN placement, other manufacturing contexts, and the like.

An illustrative window sticker assembly system 10 of the present invention is illustrated in FIGS. 1 to 6. Referring firstly to FIGS. 1 to 5, the system 10 is useful for making stickers for a wide variety of applications including vehicle and/or driver registration or authentication, combinations of these, and the like. For purposes of illustration, system 10 will be described in the context of providing a way to document vehicles and their drivers in a safe and secure manner such as for driver licenses, vehicle access to restricted areas, parking access, toll road payment or other dynamic vehicle monitoring systems, vehicle registration, vehicle inventory, and the like.

Generally, system 10 comprises carrier sheet 12 having upper surface 14 and lower surface 16. Carrier sheet 12 may be visually transparent, partially transparent, or opaque as desired. Carrier sheet 12 may be any size that is suitable for supporting the sticker body 42 and adhesive source 54 and that is capable of being used with any desired imaging techniques, such as thermographic imaging, laser printing, thermal printing, inkjet printing, screen printing, offset printing, flexographic printing, spraying, application of a decal, painting by brush, marker, pen, pencils, or roller, any electrostatic printing or thermal transfer process, combinations of these, and the like. In preferred embodiments, the sheet 12 is sized to be compatible with commercially available ink jet, thermal transfer, and/or laser jet printers to facilitate printing fixed and/or variable information onto the sheet 12 and/or other components of system 10.

Carrier 12 may be comprised of any film or sheet material, or combination or laminate of materials, either rigid or flexible, so long as carrier 12 has sufficient strength to support sticker body 42 and adhesive source 54 during handling and intended use and, optionally (although not shown in this particular embodiment), to form a part of the resultant sticker to help ensure that the sticker is sufficiently durable for its intended use. Carrier sheet 12 is shown schematically as being formed from a single layer of material, but multilayer constructions may be used as well.

By way of example, film and/or sheet materials suitable for use as carrier sheet 12 or any of the other film or sheet materials described herein may be any of those conventionally used in the manufacture of business forms and laminated cards, such as single ply or multi-ply card stock, paper stock, cardboard, polyester, fluoropolymers, olefins such as polypropylene and polyethylene, polycarbonate, polyamine, polyamide, poly(meth)acrylic, polyurethane, cellulosic material, metal foil, combinations of these and the like. Such materials may include iridescent, retroreflective, color, holographic, fluorescent, or other characteristics (which may be integral or otherwise incorporated into or onto the material), as desired.

The carrier sheet 12 includes a perforation or other line of weakness that extends across the sheet 12 and that allows the sheet 12 to be separated on demand into a top portion 20 and a bottom portion 22. For purposes of illustration, this line of weakness is in the form of a perforation line 18. The bottom portion 22 contains the constituent components on separate panels that will be combined to form a resultant window sticker. As such, the bottom portion 22 constitutes an intermediate sticker construction form of the present invention.

As an option, the top portion 20 may be subdivided into two or more regions depending upon intended uses. By way of example, the Figures show how the top portion 20 is subdivided into three separable regions. Firstly, a line of weakness in an illustrative form of perforation line 28 subdivides the top portion 20 into a first optional region 24 above the line 28 and a second optional region 26 between lines 28 and 18. The second region further includes a third region 38 defined by generally rectilinear perforation line 40. This region 38 may be generally card-shaped and may serve as an identification card, so-called cab card, wallet card, or other card corresponding to the sticker to be made using the system 10.

In this particular embodiment, the bottom 22, region 26 in the middle (encompassing the region 38), and region 24 on top are sized so that carrier sheet 12 can be folded in thirds and placed into an envelope of a standard size. In other representative embodiments in which mailing capabilities might be desired, the various regions can be foldable so that the resultant folded structure forms a self-mailing device so that a separate mailing envelope is not required.

Any one or more of the regions 24, 26, and/or 38 may include information (hidden or visible) that is at least partially the same as information included on the sticker to help correlate the components in their separate forms. Any one or more of the regions 24, 26, and/or 38 may include information (hidden or visible) that is at least partially different than information included on the sticker such as advertising, coupons, other product information, instructions or regulations, and/or the like.

The bottom portion 22 includes a first panel 32 and a second panel 34. A fold line 36 separates the panels 32 and 34. Sticker body 42 is provided on first panel 32, while adhesive source 54 is provided on second panel. The sticker body 42 and adhesive source 54 are registrably positioned relative to the fold line 36 so that at least a portion of the adhesive 60 contained within adhesive source 54 can be transferred onto at least a portion of, and preferably substantially the entirety of, the face 48 of sticker body 42. Otherwise, the exact positioning of sticker body 42 and adhesive source 54 with respect to fold line 36 is not critical. In fact, in the practice of the present invention, there is much latitude in positioning sticker body 42 and adhesive source 54 on panels 32 and 34, respectively, easing manufacturing.

However, it is preferred that each of sticker body 42 and adhesive source 54 is spaced from fold line 36 at least to some degree so that sticker body 42 and adhesive source 54 do not unduly interfere with the folding action of bottom portion 22 during adhesive transfer from the adhesive source 54 to the sticker body 42. Due at least in part to this spaced apart relationship, adhesive may be readily and easily transferred from adhesive source 54 to sticker body 42 merely by folding the two panels 32 and 34 together. Hand or other moderate pressure is all that is needed in many embodiments to cause the desired adhesive transfer. A squeegee can be used, for instance, to help burnish the adhesive into position. Neither the use of automated equipment, nor the provision of expensive and/or complex alignment features are required. It is also easier to accurately fold the intermediate construction without misalignment and/or bubbles since the fold is initiated before the sticker body 42 and the adhesive source 54 contact each other.

In the illustrative embodiment shown, the sticker body 42 is adhered in this embodiment to panel 32 via releasable adhesive layer 33 underneath sticker body 42 that allows sticker body 42 to be peeled and removed from first panel on demand. In use, at least a portion, or more typically substantially all of the adhesive layer 33 remains behind on panel 32 when sticker body 42 is removed from the panel 32. In alternative embodiments, such an adhesive layer adhering sticker body 42 to the panel 32 could be a component of the sticker body 42.

Sticker body 42 can have any of a variety of constructions, including single or multilayer constructions. In the illustrative embodiment shown, sticker body 42 has a multilayer construction. According to the illustrated multilayer construction, the sticker body 42 generally includes a release carrier sheet 41 adhered to support film 44 by adhesive layer 43. In alternative embodiments, a release coating (not shown) may be applied directly onto film 44 with or without an intervening layer to promote adhesion of the coating to the film 44. Film 44 provides many benefits. Film 44 adds thickness, giving body to the resultant label. Film 44 also protects the backprint 45 and adds stability. Film 44 can be made from a wide variety of materials including paper and polymer(s) such as polyester, polycarbonate, polyurethane, polyolefin, polyamide, polyimide, combinations of these, and the like.

Optionally, backprinted information 45 can be printed onto the support film 44 using any suitable printing technique, such as those mentioned herein. Optional components (not shown) such as RFID devices, foil devices, taggants, combinations of these, or the like, may also be adhered to support film 44 as well, if desired.

Face layer 49 is adhered to support film 44 by adhesive 46. Face layer 49 may be formed from any material(s) that are print receptive, i.e., capable of being imaged using any conventional imaging or printing technique, such as thermographic imaging, laser printing, thermal printing, inkjet printing, screen printing, offset printing, flexographic printing, spraying, application of a decal, painting by brush, marker, pen, pencils, or roller, any electrostatic printing or thermal transfer process, combinations of these, and the like. This allows desired fixed and/or variable information to be printed onto the face layer 49. Desirably, face layer 49 will be capable of being imaged by an inkjet, thermal transfer, and/or laser printer techniques.

For purposes of this application, dye sublimation will be deemed to be a type of thermal transfer process. Dye sublimation generally is a two step process. The first step involves applying ink to the surface. The second step involves a heating process that treats the surface and ink with heat to bake the image into the surface.

Optional components include items such as a foil 50 (holographic or otherwise) and/or RFID device 52. Components 50 and 52 are sufficiently low profile not to interfere with applying printed information onto face 48 and other portions of the system 10 using the desired printing technique.

Representative examples of sheet materials suitable for use as face layer 49 include a prismatic retroreflective sheet material commercially available from 3M Company under the trade designation 3M 3910F; a glow in the dark sheet material available under the trade designation V-465 90 PFW from Flexcon. Any one or more of the sticker body or components thereof may be transparent, partially transparent, and/or opaque depending upon the nature of the decal to be formed.

The adhesive source 54 generally includes a removable protective liner 56, a release coating 58 on liner 56, a pressure sensitive adhesive layer 60, and a release coating 62 provided on the second panel 34. The liner can be made of any material that can protect the underlying adhesive until the desired time of use. Examples of materials that can be used us liner 56 include paper, cardboard, polymer(s), combinations of these, and the like. In a representative embodiment, Kraft paper coated with a suitable release coating would be suitable.

It is desirable to form the sticker body 42 and adhesive source 54 by forming boundaries 51 and 53, respectively, such as by die cutting other suitable techniques, in the respective material or stack of materials forming the body 42 and source 54. Preferably, the boundaries 51 and 53 are die cut at the same time with the same tool die. This helps to ensure that the resultant body 42 and adhesive source 54 are in accurate registration with each other with respect to fold line 36. Although these cut boundaries 51 and 53 could be formed with separate tools, the use of separate tools increases the risk of registration errors. The use of a single tool to cut both boundaries also eases placement of the material or materials used to form each component. The materials can be placed without stringent tolerances so long as the material(s) covers the corresponding die cut footprint and so long as the placement does not unduly interfere with subsequent folding operations.

The respective shapes of sticker body 42 and source 54 are generally defined by the cuts 51 and 53 used to form these components. The sticker body 42 and or the source 54 can be sized and shaped in a wide variety of ways as desired. Examples of shapes include square, rectangular, circular, oval, and other geometric shapes. The shapes can also correspond to images such as trademarks, stars or other symbols, sporting items such as footballs or football helmets, states, countries, other geographic regions, famous landmarks, people, animals, things, combinations of these, and the like.

The system 10 may be provided initially with or without fixed and/or variable indicia provided thereupon, but in any case is readily imaged or printed upon demand. Any desired indicia, such as text, patterns, graphics, bar codes, biometric codes, photographs, watermarks, combinations of these, or the like, may be used. In many illustrative modes of practice, fixed information common to a series of system 10 may be printed or otherwise incorporated into or onto a plurality of embodiments of system 10 constituting the series. Variable information unique to a designated host intended to be associated with a particular sticker can then be applied onto one or more portions of system 10 as desired. The fixed information can be applied using printing techniques more suitable for high volume production, while laser printing or inkjet printing techniques can be used on-demand at any desired location using inexpensive printing equipment such as inkjet printing or laser printing equipment.

Figure 4:
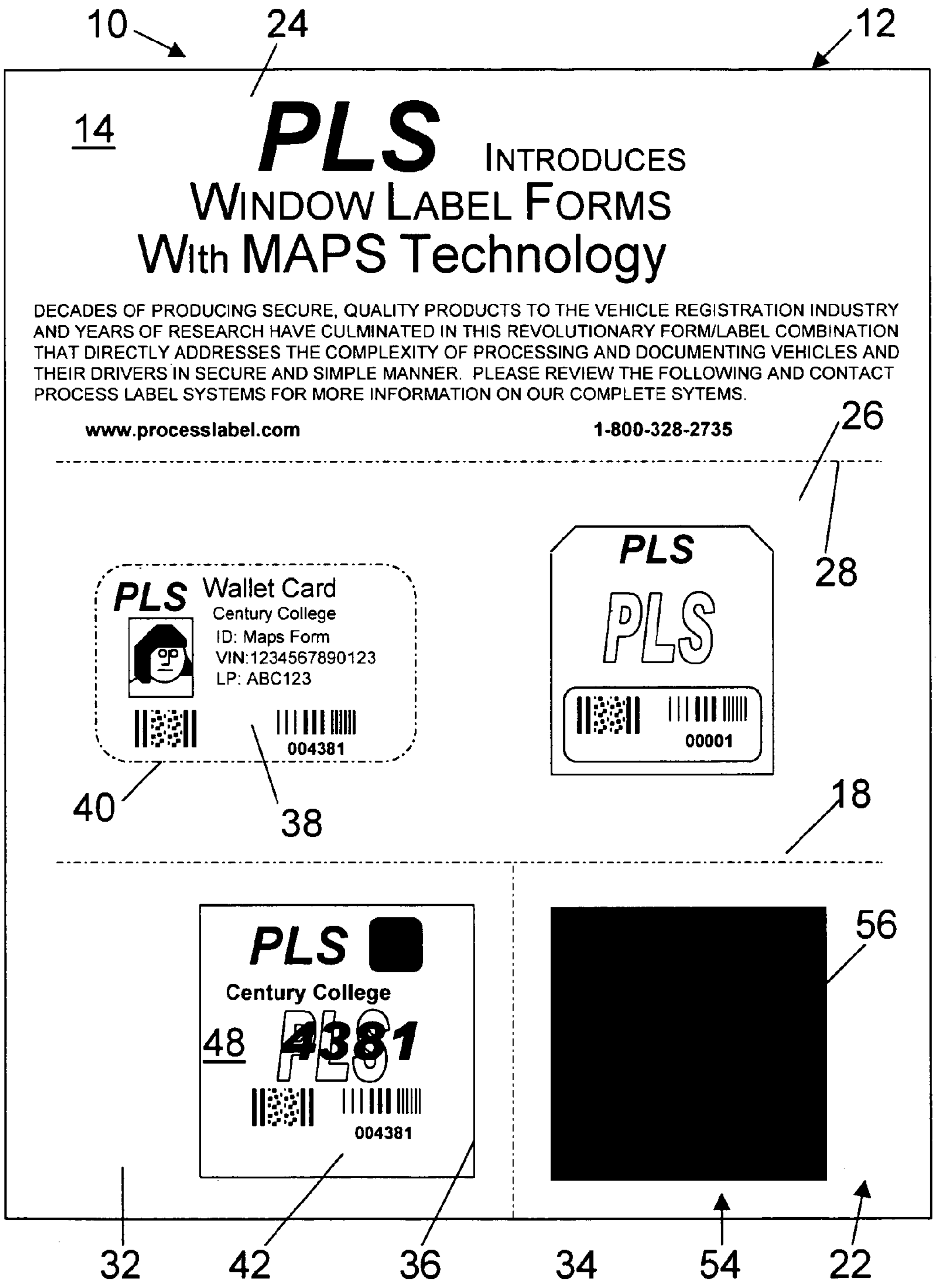
FIG. 4 is a top view of FIG. 3 is a top view of the carrier sheet, sticker body, adhesive source, and fixed information shown in FIG. 2 further comprising representative kinds of variable information that can be printed onto the system.
Figure 5:
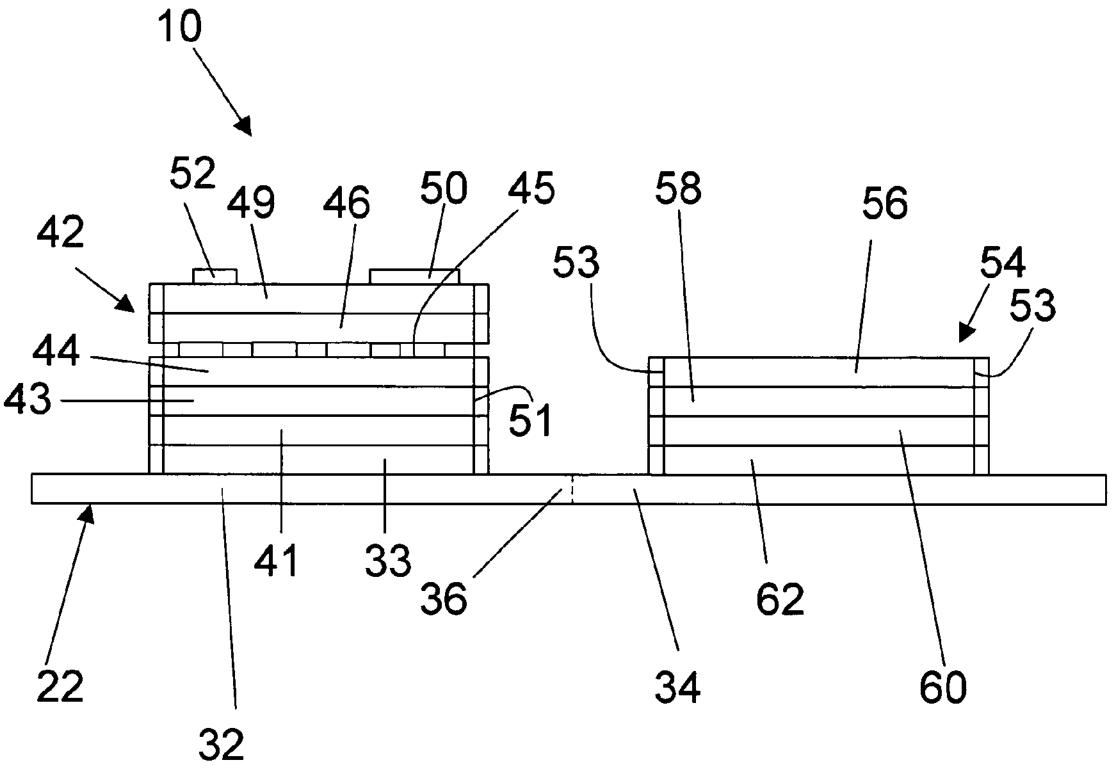
FIG. 5 is a schematic side, cross-section view of the system of FIG. 2 taken through line 5-5.

FIG. 4 shows illustrative forms of fixed information that can be applied onto system 10. The optional first region 24 includes text information in the form of advertising media that summarizes representative advantages of system 10. A website link is provided for those interested in obtaining more details about system 10. A toll-free phone number is also provided for those who might have questions or comments.

Second region 26 includes advertising information in the form of representative graphic, text, and security information that explain desirable features of the resultant sticker that can be made using system 10. Graphic information includes a representation of the resultant sticker. Text information explains features of the sticker, including the nature of the sticker body, water marks, covert security features, multidimensional bar codes, one dimensional bar codes, an RFID tag, variable printed information, tamper evident features for security and authentication, etc. Note that some of these information items appear as fixed information within the advertising information, but may appear as variable information on the resultant sticker itself. For instance, the bar codes and unique user identification indicia often would be printed onto the real sticker as variable information on demand at the point of use.

The third region 38 in this embodiment is in the form of a wallet card. Illustrative fixed information on the wallet card includes text information identifying the entity (in this case, Century College) issuing the sticker. On the first panel 32, face 48 of sticker body 42 bears similar printed information and also is shown as including an optional hologram 50 incorporated into a security foil.

FIG. 4 shows how variable information can be added to system 10. In this embodiment, unique information identifying a particular vehicle and its owner are added to the wallet card. This variable information includes a photograph of the owner, an ID associated with the owner (here shown as "MAPS Form" but often an alphanumeric number such as a drivers license number), a VIN associated with the vehicle, a license plate (LP) number associated with the vehicle, and unique bar code information. Unique variable information associated with the particular vehicle and its owner is also added to the face 48 of sticker body 42. This includes a unique sticker identification number and bar code information.

Figure 6:
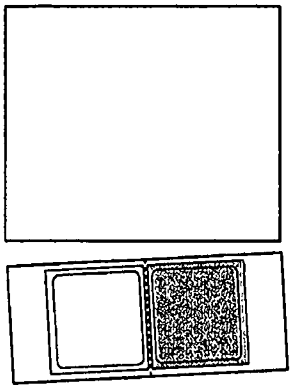
FIG. 6 schematically shows an exemplary process of the present invention for using the system of FIG. 4 to make a window sticker, such as a window sticker that might be affixed to the windshield of a motor vehicle for registration, facilities access, or other purposes.
Figure 6:
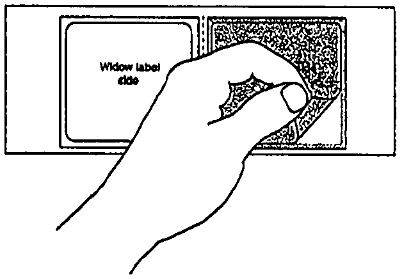
Figure 6:
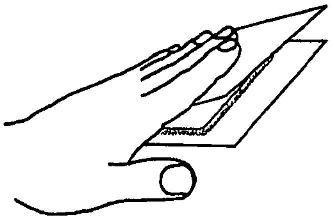
Figure 6:
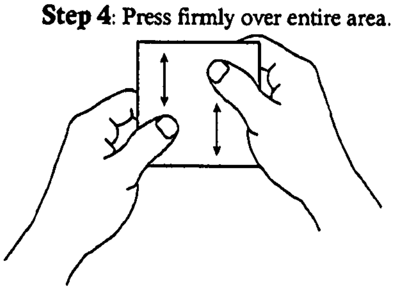
Figure 6:
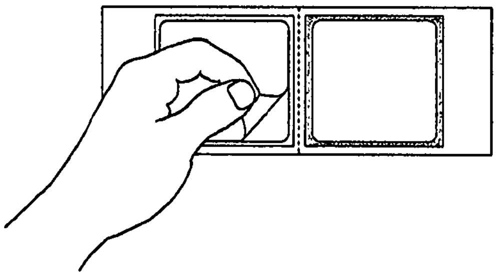

FIG. 6 schematically shows how to make a sticker using system 10 according to a mode of practice in which fixed and variable information has already been applied to the face 48 in a manner such that a window registration sticker for an automobile will be created. The system 10 up to this stage has conveniently allowed centralized printing of fixed information and decentralized printing of variably information at the point of use. The information applied onto the face 48 or other parts of the system 10 can correspond to data from one or more local and/or remote centralized databases.

In a first step, the bottom portion 22 is detached from the top portion 20. The top portion 20 or portions thereof may be stored such as in a file for record-keeping; a wallet card may be further detached from the top portion 20 for the owner of the corresponding motor vehicle to keep in a wallet or the like; instructions may be included that explain how to carry out the method of use now being described with respect to FIG. 6, including recommended placement of the sticker on the vehicle; etc.

In a second step, the protective liner 56 is removed from the adhesive source 54. This exposes the underlying pressure sensitive adhesive, which can now be easily transferred to the face 48 of the sticker body 42.

In the third step, the bottom portion 22 is folded at fold line 36 to bring the face 48 of sticker body 42 on first panel 32 into contact with the pressure sensitive adhesive 60 on the second panel 34. In step 4, pressure sensitive adhesive is transferred to the face 48 by pressing firmly over the closed first and second panels 32 and 34. In this illustrative mode of practice, note that the desired fixed and/or variable information was printed onto sticker body 42 before adhesive from adhesive source 54 was transferred to the sticker body 42. Note, too, that the pressure sensitive adhesive 60 was protected by liner 56 during the desired printing operations in order to protect the integrity of the adhesive. If the sticker body 42, now bearing pressure sensitive adhesive will not be used right away, the panels 32 and 34 can remain folded over the sticker body 42. This way, the panels 32 and 34 act as protective covers over the sticker body 42.

In Step 5, the sticker body 42, now bearing pressure sensitive adhesive on the face 48 can be removed from the first panel 32 and applied to the desired placement position such as on the windshield or other window of a motor vehicle.

The sticker body 42, bearing the adhesive, was easily formed by this method. Advantageously in many embodiments, the adhesive can be selected to be sufficiently strong to provide a security function if the sticker body 42 were to be removed from the initial placement position. In case of such a removal, the adhesive can be selected such that the adhesive grabs hold of the adjacent printed information on the sticker body. As the sticker is pulled off the substrate, at least a portion of the printing is pulled off or otherwise compromised as well and thereby destroyed. This prevents unauthorized transfer or re-use of a sticker where such security measures are desirable. This also provides visual evidence of tampering. Substantially full face coverage of the adhesive over the sticker body 42 can be practiced for maximum security protection via this mechanism.

In some embodiments, so-called stretchable adhesives (also referred to as sequential release adhesives) can be used as the adhesive that adheres sticker body 42 to a desired substrate. These adhesives can still pull off or otherwise disrupt inks for security but are relatively easy to remove from the substrate also. Using these kinds of adhesives would be desirable where placement is temporary and/or if the sticker is replaced periodically, e.g., annually. Examples of such adhesives have been described in U.S. Pat. Nos. 6,001,471 and 5,507,464. See also U.S. Pat. Nos. 5,770,283 and 5,397,117.

This preferred and illustrative mode of practice shown in FIG. 6 uses a manual adhesive placement ("MAP™") approach in the sense that the adhesive from another location is caused to be placed onto the face 48 by the peeling, folding, and pressing action of a user. Although this activity could be automated, the manual approach allows the stickers to be easily manufactured on demand as needed from an inventory of systems 10 such that the stickers bear unique identifying indicia corresponding to a particular motor vehicle or other desired substrate. The manual approach avoids the need for specialized hardware and the associated expense.

A supply of systems 10 can be standardized and inventoried for particular uses, e.g., motor vehicle registration, parking lot access, facilities access, manufacturing processes, or the like. Via top portion 20 and optionally bottom portion 22, the system 10 provides surfaces for additional information to be provided and printed on demand that desirably relate at least in part to the sticker being made. The resultant sticker itself can easily incorporate one or more kinds of security features such as retroreflective materials, holograms, security inks (e.g., thermochromic and thermachromic as examples), microencoded particles, water marks, radio frequency transponders, specialized security cuts, combinations of these, and the like.

Other approaches for applying adhesive onto a sticker face might rely solely upon spraying, brushing, masked adhesive transfer, or the like. The transfer of at least a portion of the desired adhesive from source 54 provides numerous advantages. The mess and inefficiency of spray and other coating approaches is avoided. The need for breathing masks recommended when using spray adhesives is also avoided. The expensive hardware needed for masking adhesive transfer systems is also avoided, reducing cost and complication. Because the sticker body 42 and the adhesive 60 can be designed substantially for the desired size required for the desired specific application, waste can be reduced. The system 10 is also fast and easy to variable print with custom indicia at the point of use using readily available ink jet, thermal transfer, and/or laser printers.

The embodiment shown in the Figures positions the sticker body 42 and the adhesive source in the bottom portion 22. Alternatively, these components and a suitable fold allowing these components to be folded together can be located in other positions on the carrier sheet, such as in the middle or top locations. In some embodiments, a carrier sheet can carry multiple sticker body/adhesive source sets instead of a single set. The embodiment shown in the Figures also has a single adhesive source that is caused to transfer adhesive to the sticker body by folding action. In other embodiments, there can be multiple sources that can be folded onto the sticker body for adhesive transfer. Each such panel might, for instance, cover respective portions of the sticker body. This could allow different kinds of adhesives to be transferred to different and/or the same locations of the sticker body depending upon whether the different adhesive sources folded onto the same or different portions of the sticker body. In some instances, each adhesive source might only correspond to only a portion of the sticker body rather than substantially the full face of the sticker body. In some instances, the partial coverages may be distinct from each other or they may overlap at least to some extent.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making an adhesive sticker, comprising the steps of:

a) providing an intermediate comprising a carrier sheet comprising a fold line defining first and second panels, wherein a sticker body having a face layer is supported on the first panel and a protected, releasable and transferable adhesive is transferably supported on the second panel between a release liner provided on the adhesive and a release coating supporting the transferable adhesive such that removing the release liner exposes the transferable adhesive, said sticker body and transferable adhesive being registrably positioned with respect to the fold line, and wherein a perforation line separates the first and second panels from at least one other region of the carrier sheet;

b) printing information onto the intermediate and said at least one other region while the transferable adhesive on the second panel is protected by the release liner; and c) after printing, removing the release liner provided on the transferable adhesive to expose the transferable adhesive, and folding at least the first and second panels together under conditions effective to transfer at least a portion of the transferable adhesive from the second panel onto at least a portion of the face layer of the sticker body such that, after the adhesive is transferred, the transferred adhesive is exposed and useable to affix the face layer of the sticker body onto a substrate.

2. The method of claim 1, wherein step (b) comprises printing information onto the face layer of the sticker body.

3. The method of claim 1, wherein at least one other region of the carrier sheet includes a perforation boundary defining a card-shaped member.

4. The method of claim 1, wherein the intermediate is foldable to fit into an envelope.

5. The method of claim 1, wherein the intermediate is foldable to provide a self-mailing device.

6. The method of claim 1, wherein the sticker body is adhered to the first panel by a releasable adhesive.

7. The method of claim 6, wherein said releasable adhesive is a component of the carrier sheet.

8. The method of claim 6, wherein said releasable adhesive is a component of the sticker body.

9. The method of claim 1, wherein the sticker body further comprises a support film, a releasable adhesive interposed between the support film and the carrier sheet and adhering the sticker body to the carrier sheet, and wherein the face layer overlies the support film.

10. The method of claim 9, further comprising back-printed information interposed between the face layer and the support film.

11. A method of applying an adhesive sticker body onto a substrate, comprising the steps of:

a) providing an intermediate comprising a carrier sheet comprising a fold line defining first and second panels, wherein a sticker body having a face layer is supported on the first panel and a protected, releasable and transferable adhesive is transferably supported on the second panel between a release liner provided on the transferable adhesive and a release coating supporting the transferable adhesive such that removing the release liner exposes the transferable adhesive, said sticker body and transferable adhesive being registrably positioned with respect to the fold line, and wherein a perforation line separates the first and second panels from at least one other region of the carrier sheet;

b) printing information on the intermediate and the at least one other region while the transferable adhesive on the second panel is still protected, said printing including printing information onto the face layer of the sticker body;

c) after step (b), removing the release liner provided on the transferable adhesive to expose the transferable adhesive and folding the first and second panels together under conditions effective to release and transfer at least a portion of the transferable adhesive from the second panel onto at least a portion of the face of the sticker body such that, after the adhesive is transferred, the transferred adhesive is exposed and useable to affix the face layer of the sticker body onto a substrate; and d) after transferring the adhesive, removing the sticker body from the carrier sheet e) applying the removed sticker body to a substrate in a manner such that the transferred adhesive helps hold the sticker body on the substrate.

12. The system of claim 11, wherein at least one other region of the carrier sheet includes a perforation boundary defining a card-shaped member.

13. The system of claim 11, wherein the intermediate is foldable to fit into an envelope.

14. The system of claim 11, wherein the intermediate is foldable to provide a self-mailing device.

15. A system useful for making an adhesive sticker body, comprising a carrier sheet comprising a fold line defining first and second panels, wherein a sticker body having a face layer is supported on the first panel and an adhesive source comprising a protected, transferable adhesive is releasably and transferably supported on the second panel between a release liner provided on the transferable adhesive and a release coating supporting the transferable adhesive such that removing the release liner exposes the transferable adhesive, said sticker body and transferable adhesive being registrably positioned with respect to the fold line in a manner such that the transferable adhesive can be transferred to at least a portion of the face of the sticker body by folding at least the first and second panels together such that, after the transferable adhesive is transferred, the transferred adhesive is useable to affix the face layer of the sticker body onto a substrate.

16. The system of claim 15, wherein the sticker body is adhered to the first panel by a releasable adhesive.

17. The system of claim 16, wherein said releasable adhesive is a component of the carrier sheet.

18. The system of claim 16, wherein said releasable adhesive is a component of the sticker body.

19. The system of claim 15, wherein the sticker body further comprises a support film, a releasable adhesive interposed between the support film and the carrier sheet and adhering the sticker body to the carrier sheet, and wherein the face layer overlies the support film.

20. The system of claim 19, further comprising back-printed information interposed between the face layer and the support film.

21. A system useful for making an adhesive sticker body, comprising a carrier sheet comprising a fold line defining first and second panels, wherein a perforation line separates the first and second panels from at least one other region of the carrier sheet, wherein the at least one other region comprises printed information, wherein a sticker body comprises fixed and variable information and has a face that is supported on the first panel and a protected, releasable, and transferable adhesive is releasably and transferably supported on the second panel between a release liner provided on the transferable adhesive and a release coating supporting the transferable adhesive such that removing the release liner exposes the transferable adhesive, said sticker body and transferable adhesive being registrably positioned with respect to the fold line in a manner such that the transferable adhesive can be transferred to the face of the sticker body by folding at least the first and second panels together such that, after the transferable adhesive is released and transferred, the released and transferred adhesive is useable to affix the face layer of the sticker body onto a substrate.

* * * * *